United States Patent [19]

Gliemeroth et al.

[11] 4,188,089
[45] Feb. 12, 1980

[54] OPTICAL FIBERS HAVING HIGH INFRARED TRANSMITTANCY

[75] Inventors: Georg Gliemeroth, Finthen; Lothar Meckel, Ostrich, both of Fed. Rep. of Germany

[73] Assignee: Jenaer Glaswerk Schott & Gen., Mainz, Fed. Rep. of Germany

[21] Appl. No.: 846,238

[22] Filed: Oct. 27, 1977

[30] Foreign Application Priority Data

Oct. 27, 1976 [DE] Fed. Rep. of Germany ....... 2648702

[51] Int. Cl.² ............................................. G02B 5/14
[52] U.S. Cl. .............................. 350/96.34; 65/3 A;
427/166; 427/237; 427/248 J
[58] Field of Search ............... 350/96.30, 96.31, 96.34, 350/320; 65/3 A; 427/166, 167, 237, 248 J

[56] References Cited

U.S. PATENT DOCUMENTS

| 2,883,291 | 4/1959 | Fraser | 106/47 Q |
|---|---|---|---|
| 3,209,641 | 10/1965 | Upton | 65/3 A X |
| 3,241,986 | 3/1966 | Jerger, Jr. | 350/96.34 X |
| 3,791,714 | 2/1974 | Maurer | 350/96.34 |
| 3,933,454 | 1/1976 | DeLuca | 350/96.34 X |
| 3,999,835 | 12/1976 | Newns et al. | 350/96.34 X |
| 4,025,156 | 5/1977 | Gloge et al. | 350/96.34 X |
| 4,033,667 | 7/1977 | Fleming, Jr. | 350/96.34 X |

FOREIGN PATENT DOCUMENTS

| 2158515 | 5/1973 | Fed. Rep. of Germany | 350/96.34 |
| 2546162 | 9/1976 | Fed. Rep. of Germany | 350/96.31 |
| 5188237 | 8/1976 | Japan | 350/96.30 |

Primary Examiner—John K. Corbin
Assistant Examiner—John D. Lee
Attorney, Agent, or Firm—Millen & White

[57] ABSTRACT

Optical fibers having high infrared transmittancies are produced by chemical vapor deposition of vitreous layers composed predominantly of anions S, Se and/or Te onto tubes or rods. Cations are Ge, Si, P, B, As, Sb and/or Ti. Conventional CVD techniques are employed to produce stepped-refractive index gradient profiles in the fibers except that an inert gas and/or a halogen(s) is used as the propellant gas.

12 Claims, 11 Drawing Figures

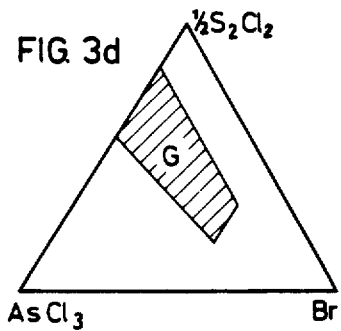
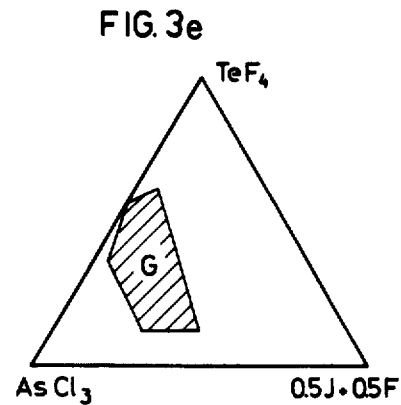
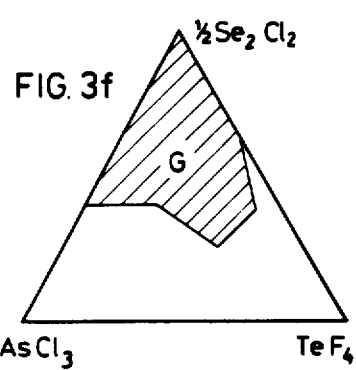
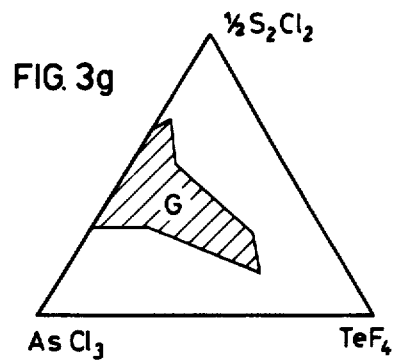
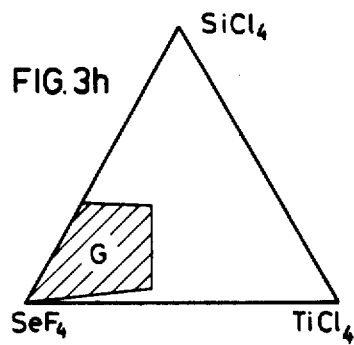
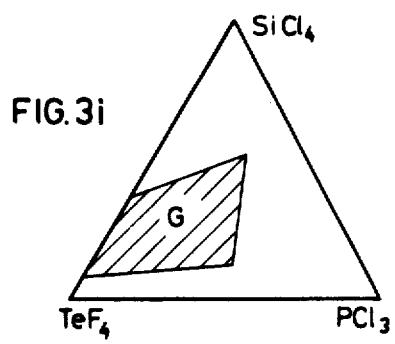

OPTICAL FIBERS HAVING HIGH INFRARED TRANSMITTANCY

BACKGROUND OF THE INVENTION

The present invention concerns optical, i.e., light-conducting fibers, which are transparent to infrared radiation and can be used for transmission of energy, e.g., from high energy infrared lasers (e.g., CO and $CO_2$-lasers).

The problem of overloading of the existing limited capacity energy-flow-carrying conductor lines, which is increasingly becoming a problem even now, has given rise to a general search for new energy-transmitting conductive materials. This research has most recently been extended to the field of optical energy transmission which has acquired increasing significance as an alternative to conventional electrical energy transmission systems. High energy light sources, such as lasers and light-emitting diodes (LED) are currently being used in medical technology, materials processing and telecommunications. However, so far, this type of transmission has been confined to non-flexible beams or transmission cables comprising copper. Inorganic glass, which is cheap by comparison with copper, is currently being developed into a genuine substitute material for use in telecommunications transmission systems. This new transmission system consists of a source—the transmitter, which typically is either a laser or an LED, to which the transmission line, i.e., the glass fiber, is coupled, and a receiver joined to the end of the line. This basic assembly can be repeated several times in succession. The quality of the transmission depends in all practical applications on the amount of transmittable energy, i.e., on the transmittancy of the line.

Particularly favorable transmission capacities, i.e., high information densities, can be achieved in fibers of this kind with the aid of refractive-index-gradient profiles in the light conducting optical fiber core. In refractive-index gradient fibers the light is transmitted, not by total reflection, but by re-direction into the interior of the fiber core due to the given refraction-gradient profile.

With special reference to telecommunications in the infrared region of the spectrum, the work of Kao & Hockhaus (Proc. IEEE 113 (1966) 1151) clearly indicates the potential, as well as the aims and targets, for the development of suitable communication fibers. Even in this early work, it was recognized quite clearly that there are two vital factors which must be given equal consideration, namely, transmission losses (e.g., due to absorption or other factors which attenuate the strength of the energy carrying the information over the length of the fiber), and transmitting capacity (i.e., the quantity of information which can be transmitted). Initially, research emphasis was centered on reducing the losses due to absorption in the wavelength range of the light sources which would ultimately be used. Owing to the great difficulties which were encountered in earlier attempts to make low-loss light conductors, research was concentrated for a very long time on stepped-index fibers while the equally important demand for satisfactorily high transmitting capacity was approached rather late.

Initially the light sources are likely to be lightemitting diodes (LED). These have an incoherent and weakly directed emission in the wavelength range of 750 to 900 nm. Later generations will probably use semiconductor injection lasers, i.e., coherent light sources in the same wavelength range. The wave band for the laser is determined, for example, by suitable choice of a particular AlGaAs laser as the semiconductor laser. The shift toward the infrared region of the spectrum will progress to increasingly longer wavelengths in the future. Consequently, the infrared region is of particular interest.

In addition to pure absorption losses and those due to some light scattering or diffusion, other additive causes of light loss exists such as losses due to bending of the conductors, to geometrical variations in the fiber cross section etc. For material processing and medical technology, flexible transmission lines are needed with a minimum of such losses even over longer transmission distances. By virtue of their high transmittancy, they must provide an optimum of energy transmission from infrared lasers which have outputs in spectral regions above 1 $\mu$m and provide highly homogeneous impulses.

In order to obtain the required low-loss quality in the optical fiber it is essential to achieve extremely low absorption, i.e, to produce fibers containing an absolute minimum of absorbing impurities. Such fibers, insofar as these exist at all today, are almost exclusively produced by the CVD technique, i.e., by precipitation from the vapor phase. This CVD technique is quite old and dates as far back as approximately 1940 (J.O.S.A. 36 (1946) 702 ff). It is based on the pyrolytic oxidation of metallic chlorides. These metallic chlorides are often present in the liquid state, e.g., as $SiCl_4$ or $GeCl_4$, or can be easily liquified under pressure, e.g., $BCl_3$. The advantages of such liquid metallic chlorides, or metallic halides, derive from their ready distillability so that it is possible to satisfy the requirement of a low absorption quality in the fiber by virtue of the purity obtainable with such raw materials. This same vapor deposition or precipitation process is also very widely used in semiconductor technology.

Currently there are two methods which are primarily used for making light-conducting glass fibers for optical fiber conductors in telecommunications. Although there are essential differences between these two methods, they both use the CVD process to produce an oxide precipitate for the optical fiber. The first patents in the field of glass fiber production for optical fiber conductors in telecommunications apply this process to obtain a white, soot-like precipitate which, according to experience borrowed from semiconductor technology, can be obtained with a remarkable degree of purity. Later patent applications have reverted to the older method of producing a glassy material directly from the gaseous phase by application of the CVD process. Both of these methods are used for applying either an exterior layer coating of a material having a lower refractive index to an extremely clean and pure rod of flint glass, or an interior layer coating of higher refractive index material to a tube of flint glass. The rod-like preforms which are produced in this way are then drawn out into fibers. The desired refractive index gradient is produced during the manufacture of the preform by varying the composition of the deposited precipitates (coatings). For the external layer coating process, the refractive index of the material is reduced stepwise with increasing distance from the axis of the preform. For the internal layer coating method, on the other hand, the refractive index is stepwise increased with increasing approach to the fiber preform axis. Following the interior layer coating process, when all required layers have been deposited, the internally-coated tube is collapsed to form a rod-like preform.

The actual precipitate, whether it be vitreous or sooty, is obtained by propelling the metallic halide molecules by and in a stream of oxygen into a temperature controlled region where they react with the oxygen and are precipitated as oxides. The halides evaporate. Depending on the kind of metals used in the process (Si→SiO$_2$; Ge→GeO$_2$; Ti→TiO$_2$, B→B$_2$O$_3$ etc.), the required reaction temperature is generated by oxyhydrogen burners or plasma. In these cases the pyrolytical reaction is an oxidation by the additionally supplied propellant gas, i.e., oxygen.

SUMMARY OF THE INVENTION

Accordingly, it is an object of the present invention to provide a light conducting, i.e., optical conducting fiber which is suitable for optical energy transmission and has particularly good light transmission in the infrared region of the spectrum above 600 nm.

It is another object of this invention to provide such a light conducting fiber which has a minimum of absorption bands in the wavelength range between 600 nm and 8 μm, and, preferably even up to 15 μm.

It is yet another object of this invention to provide an optical fiber which by virtue of such low absorption in the infrared spectral region, permits the transmission of infrared light for applications in surgical or medical technology, telecommunications and other energy-transmitting systems using lasers and LED's.

It is still another object of this invention to provide such a fiber wherein it is relatively easy to obtain a predefined refractive-index gradient for light transmission in the fiber interior, thereby increasing the transmission capacity of the optical fiber conductor.

It is another object of this invention to provide a process for preparing such a low loss optical fiber.

Upon further study of the specification and appended claims, further objects and advantages of this invention will become apparent to those skilled in the art.

These objects have been attained by providing conventiently manufactured light-conducting fibers, having particularly good transmittancy in the infrared spectral region, comprising glass cores whose anions are predominantly ions of S, Se and/or Te. The cations in these light-conducting cores, on the other hand, are preferably ions of Ge, Si, P, B, As, Sb and/or Ti.

Such light-conducting fibers can be produced by precipitation of halides of S, Se, Te on the one hand, and halides of Ge, Si, P, B, As, Sb, Ti on the other, from the vapor phase by glass-decomposition processes to form light-conducting glass cores. These processes are conventional except that the conventional propellant oxygen must not be used.

In its place inert gases and preferably Cl$_2$ is used as the propellant. It is also possible to incorporate considerable quantities of halides (up to approximately 40 atomic %) in the resulting glass or vitreous material. These can also be precipitated from the vapor phase.

BRIEF DESCRIPTION OF THE DRAWINGS

FIGS. 3a–3i are compositional diagrams of several ternary systems which can be used in the optical fiber of this invention.

DETAILED DISCUSSION

Figure 1:
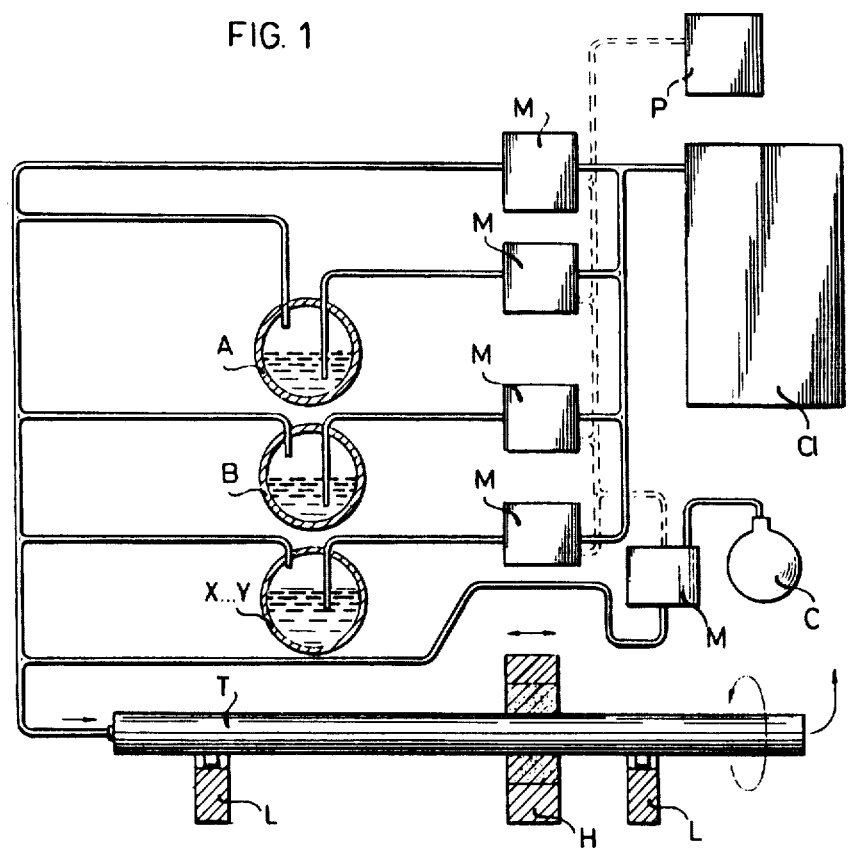
FIG. 1 shows a typical apparatus which can be used to prepare the optical fibers.

It was found that the objects of this invention could be attained by departing from the conventional CVD process which involves the use of an oxygen propellant. The conventional pyrolysis of metallic halides in the presence of oxygen results in the formation of oxidic glasses which have basic disadvantages. The presence of any protons at all will cause the formation of water or OH groups. These give rise to strong absorptions in the infrared, resulting in the formation of distinct bands at 960 nm, 1200–1600 nm and, especially, at 2800–3000 nm. Other problems attributable to metallic halide oxidation into oxides include defective oxide structures and unfavorable material dispersion. By contrast, it has been discovered that considerable advantages can be obtained by making oxygen-free components.

According to this invention, it is possible to produce light-conducting fibers having transmission spectra which are virtually band-free in the infrared spectral range. Moreover, it is considerably easier to produce an oxygen-free precipitate from the gaseous phase and the reaction can be carried out at lower temperatures than those required for the conventional CVD process based on oxidation. This is especially found as a new remarkable way of synthesis because of lower activation energies between Ge, Si, P, B, As, Sb, Ti on the one hand and S, Se, Te on the other hand compared with the same metals and oxygen. Also, the reaction kinetics are in most of these cases faster. Another advance is a better possibility of achieving fast glassy deposition in areas of composition which in bulk glass systems tend to crystallization.

Especially in such cases also higher yields of reaction were found; higher than assumed from calculations of the physicochemical data or all other prior experiences. Up to a 7 μm layer thickness can be achieved with one travel of the burner along the tube.

By the term "predominantly" is meant that 60–100 atom percent, preferably 55–95 atom percent, of the anions are anions of S, Se and/or Te. Permissible anions are and their ranges of content include: halides (0–45 atom percent, preferably 5–45 atom percent) and physically solved inert gases (less than 5 atom percent). Suitable cations are Ge, Si, P, B, As, Sb, Ti and mixtures thereof. Preferably, only these cations are used. As is customary in CVD technology, because the halides of these anions and cations can be obtained with very high purity, impurity cations and anions are present in only very small amounts.

The optical fibers of this invention can be fabricated by the conventional CVD technique except for the substitution of a halogen, e.g., chlorine, or an inert gas such as, He, Ne, Ar or Kr for the usual oxygen propellant gas. Thus, by making this substitution and by using halides of the appropriate anions and cations mentioned above, a worker skilled in the CVD process can easily prepare the fibers of this invention using conventional considerations to determine suitable process conditions. A comprehensive overview of the normal CVD-process for fibers is given by David Pearson, Glass Fiber Waveguides For Optical Communication Applications, Appl. Solid State Sciences, 1976, 6, 173–242 whose disclosure is incorporated herein. For example, as discussed in the examples below, the desired proportions of atoms can be attained by routine selection of relative flow rates of the propellant gas through the chamber containing the halide starting materials. The desired systems (binary, ternary, quarternary, etc. and combinations thereof), the proportions of anions and cations therein, layer thicknesses (flow times), etc. are selected in accordance with the spectral index of refraction distribution desired in the optical fiber.

Methods for selecting the composition of the precipitated vitreous layer as a function of radial distance from the center of the tubular rod so that the resultant refractive index profile of the optical fiber corresponds to that desired, are not known. The details have to be examined for every composition of anions and cations by preparation of the fibers and measuring the refractive index profile with experimental set ups known from the normal fiber technology.

Conventional substrate rods and tubes are employed for the deposition, such as silica glass tubes, vycor glass tubes and other glass composition tubes. End product fibers have diameters of 50-290 μm, preferably 60 to 150 μm.

Several embodiments of this invention are more specifically described below with reference to a simple laboratory test apparatus designed for this purpose. It will, however, be appreciated that different arrangements and dispositions are equally conceivable.

FIG. 1 shows a gas bottle Cl containing chlorine gas, from which a stream of chlorine flows through a flow-volume regulator M. The correctly measured dose of chlorine is then conducted, either directly or through charging or doping vessels, into a glass tube T. The charging or doping vessels are filled with liquid halide compounds so that the chlorine stream can there be doped or charged with molecules of such halide compounds before it enters into the tube T. The flow-volume regulators M may be controlled by a programmer P to provide the correct dosage in each case. Such volume or flow regulator apparatus may also be provided to control gaseous as well as, where appropriate, compessed components C. The gaseous streams are combined forwardly of the tube T, which is mounted on roller bearings L, flow through the tube and pass into the effective temperature zone of a suitable heat source H. It is here that decomposition takes place, namely pyrolysis to form metallic sulfide, selenide and/or telluride glass.

The excess chlorine leaves the tube at the opposite end. The heat source is slidingly displaced to and fro over the length of tube parallel with the tube axis to ensure an even layer coating along the inner wall surfaces of the tube. By stepped variation of the concentration of the metallic halides and halides of sulphur, selenium and tellurium which are carried along in the stream of chlorine gas, and with the aid of the flow-volume regulator M and the programmer P, it is possible to vary the composition of the resulting glass from layer to layer in the course of the coating process. When a sufficiently thick layered interior coating of varying concentration has been precipitated, the tube is collapsed by conventional methods to form a rod, or preform, which is subsequently drawn out into a fiber.

By application of this method, using metallic halides of germanium, silicon, titanium, phosphorous, antimony, boron and arsenic as well as halides of sulphur, selenium and/or tellurium, it is possible to obtain numerous variations of the refractive index. Also, it is equally possible to use the conventional exterior layer coating process instead of the conventional interior tube coating method hereinbefore described, and to incorporate up to 40 atomic % of halides such as chlorine, bromine, iodine and/or fluorine in the glass product.

For example, the liquid contained in doping or charging vessel A may be $GeCl_4$, $SiCl_4$, $TiCl_4$, $PCl_3$, $SbCl_5$, $AsCl_3$ etc. The liquid in vessel B may consist of $TeF_4$, $SCl_2$, $S_2Cl_2$, $Se_2Cl_2$, $SeF_4$, etc. The liquids in doping vessels X . . . Y may be additional supplies of components from the group contained in vessel A, or from the group contained in vessel B, and any desired number of additional doping vessels may be easily included in the layout. Vessel C contains gaseous components, e.g., $BCl_3$. Vessels A, B, X . . . Y may also contain components which have a higher than room temperature melting point provided the whole system, or the critical parts thereof, are thermostatically maintained at suitably higher temperatures.

Instead of, or in addition to chlorine gas, the propellant gas may be any other halide or an inert gas such as He, Ar, Kr, etc., used separately or in combinations.

With the aid of apparatus of the kind shown in FIG. 1 it is possible within the framework of this invention to produce a wide range of light-conducting fibers of different composition as shown in the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In the simplest form of application of this invention, all other doping or dosage-applying facilities are omitted except for the doping vessels A and B. The liquid in A is germanium-tetra-chloride at 20° C., and the liquid in B is sulphur-dichloride at 20° C. By setting the rate of chlorine flow through A to 45 ml/min., and the chlorine flow through B to a rate of 48 ml/min., with the rate of flow for excess chlorine set at 10 ml/min., a gaseous stream will be obtained which, when introduced into the rotating tube T, produces a glassy, or vitreous precipitate on the interior wall surfaces of the tube if the heat source provides an effective temperature of 878° C.±25° C. in the tube interior. In this example, the heat source was an annular platinum tube which was thicker than the rotating glass tube. This platinum tube was used as a resistor. It was 2.5 cm long and had an interior diameter of 24 mm. The walls of the platinum tube were 2 mm thick and carried an electric current of approximately 480 amps at 0.6 volts. The initial glass tube to which the interior layer-coating process was applied, was a standard, commercially available tube of sodium-calcium-silicate glass, which was engaged at both ends thereof in the chucks of a parallel lathe and provided with means for partial heating in a defined region to a temperature higher than the plastification temperature of the glass. The internal coating consisted of $GeS_2$ in vitreous form.

A constant concentration was chosen for this basic experiment to demonstrate the principles of the process. After the tube was collapsed to make the preform, and then drawn out into a fiber, a stepped-index light-conducting fiber was obtained which had a light-conducting core of vitreous $GeS_2$.

EXAMPLE 2

Figure 2:
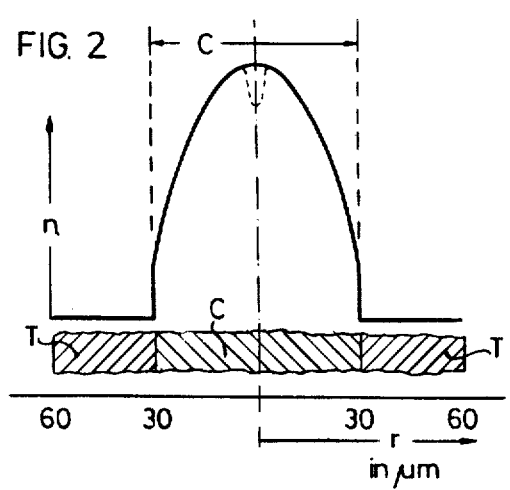
FIG. 2 shows a refractive index profile of an optical fiber of this invention.

By making full use of the facilities presented by the apparatus shown in FIG. 1, a refractive-index gradient profile fiber was produced in the manner and under the conditions specified below:

The doping vessel A contained $GeCl_4$, and vessel B contained $SCl_2$. An additional doping vessel X contained liquid $PCl_3$. Chlorine gas was again used as propellant. The flow-volume regulators were set in such a way that chlorine gas flowed at the rate of 175 ml/min. through the vessel containing germanium chloride, at the rate of 245 ml/min. through the vessel containing $SCl_2$, and at the rate of 280 ml/min. through the vessel containing $PCl_3$. In the course of the interior layer-coating process the concentration was stepwise modified up to a final concentration corresponding to a rate of flow of 350 ml/min. of chlorine gas through the vessel containing $GeCl_4$, 245 ml/min. through the vessel contaning $SCl_2$, and 105 ml/min. through the vessel containing $PCl_3$. In the resulting vitreous internal coating in the tube, the first layer, i.e., the layer deposited directly on the inner wall surface of the initial glass tube, was composed of 25 atomic % Ge, 35 atomic % S, and 40 atomic % P, while the last vitreous layer which was nearest to the center of the tube had a composition of 50 atomic % Ge, 35 atomic % S and 15 atomic % P. Preliminary experiments showed that a constant temperature of 790° ± 10° C. provided by the heat source throughout the duration of the process was the most favorable processing temperature. The internal coating process involved, in all, the application of 52 layers of relatively different composition with a means layer thickness of 7 μm. The subsequent operations of collapsing the tube and drawing the fiber were executed under conventional conditions at a temperature which was higher than the plastification point of the initial sodium-calcium-silicate glass tube. The refraction-index profile of the resulting light-conducting fiber is shown in FIG. 2. For an overal fiber thickness of 120 μm, the light-conducting core had a diameter of 60 μm surrounded by an outer wall of 30 μm of the tube material T. The refractive index in the outer wall T is constant and corresonds to that of the sodium-calcium silicate glass used. In the light-conducting core C in the fiber interior, the refractive index increases parabolically, after an initial jump at the interface with the outer wall. In the center of the fiber core there is a small mimimum due to evaporation loss which, however, does not affect the quality of the fiber with regard to transmittancy because by far the major part of energy is transported in the parabolic region of the fiber profile.

Figure 3A:
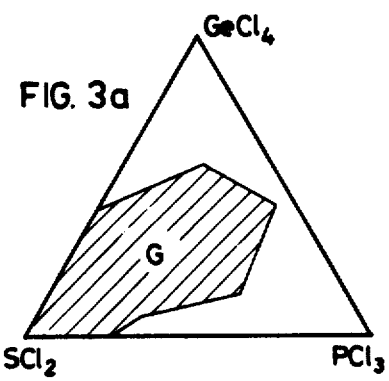
Figure 3B:
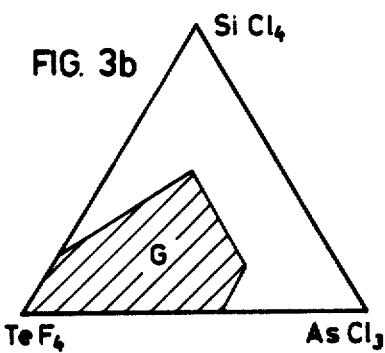
Figure 3C:
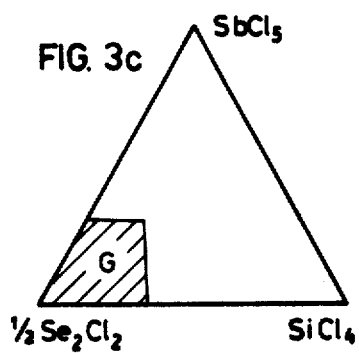

This comparatively simple ternary system $GeCl_4$-$PCl_3$-$SCl_2$ alone offers numerous possibilities of concentration variations. Assuming that vapor pressure is maintained equal in the doping vessels by appropriately differentiated thermostatic control, the quantities of propellant chlorine gas, which are proportional to the quantities of the respective halides transported thereby, can be represented as the halides themselves in the ternary system. FIG. 3 shows the appropriate propellant gas quantities for the system $GeCl_4$-$PCl_3$-$SCl_2$ represented by the transported amounts of halides. This form of representation affords an easy and convenient method of determining the ranges within which vitreous internal layer coatings can be produced in such a system according to the present invention. The amounts in question are represented in volume %. The shaded area G represents the region of vitrification (glass formation).

All of the various possible combinations shown in FIGS. 3a to 3i may also be extended to quaternary systems by adding the component $BCl_3$. It is also possible to combine two or more of the ternary systems shown in FIGS. 3a to 3i. Additional cations, insofar as these are not obtainable in compounds or combinations which are liquid at room temperature, may be included in the process by using apparatus which is at least partially theremostatically maintained at higher than room temperature.

EXAMPLE 3

The following components are contained in their respective doping vessels, which are thermostatically maintained at 25° C.: $SiCl_4$, $PCl_3$, $TeF_4$, $BCl_3$ and $SCl_2$. The layers of $SiCl_4$, $BCl_3$ and $SCl_2$ are precipitated at the beginning of the process. For this purpose the heat source provides an interior tube temperature of 840° C. The rate of flow of the propellant chlorine gas (controlled by M) is 91 ml/min. The $SCl_2$ flow rate, controlled by M, is 380 ml/min. The $BCl_3$ flow rate must be controlled by M in such a way that 7 parts of $BCl_3$ will be introduced into the combined stream as compared with 91 parts of $SiCl_4$ and 380 parts of $SCl_2$. In all, 15 layers of constant composition are applied to the inner walls of the tube. Then the heat source is adjusted to reduce the temperature in the interior of the tube to 760° C. Further layer precipitation is applied with the components $SiCl_4$, $PCl_3$ and $TeF_4$. The propellant chlorine gas flow is regulated by M in such a way that 372 ml/min. flow through the doping vessel containing $SiCl_4$, 124 ml/min. through the vessel containing $PCl_3$ and 744 ml/min. through the vessel containing $TeF_4$. In the course of this further layer precipitation, the composition is varied stepwise in linear progression up to the composition of the final layer. The composition of this final layer is controlled with the aid of the regulator M in such a way that for deposition of this final layer the chlorine gas flows through the $SiCl_4$-doping vessel at the rate of 186 ml/min., through the vessel for $PCl_3$ at the rate of 310 ml/min. and through the vessel containing $TeF_4$ at the rate of 744 ml/min. Thereafter, the tube is stepwise collapsed under stepwise reduction of chlorine gas flow. The flow of the propellant gas is finally turned off before the final collapsing stage. The tube is then collapsed into the preform and the latter drawn out into a fiber. The resulting light-conducting fiber has a diameter of 100 μm, with an outer wall consisting of the material of the initial tube. Viewing in the inward direction, this outer wall is succeeded by a region of constant composition consisting of a glass which embodies the components Si, B and S. This constant layer, which is designed to prevent diffusion of oxygen from the outer tube into the light-conducting core interior and which also has a lower refractive index than the lightconducting core, is succeeded by the light-conducting core which is made up of the components Si, P and Te. It is composed in such a way that its layers present a parabolic refractive index profile whose the refractive index gradient corresponds to the equation $y = x^a$, wherein the exponential a is $1.7 < a < 2.2$; y is the refractive index and x is the normalized relative radial position in the tube. This light-conducting fiber with improved infrared light transmittancy has only extremely weakly defined water absorption bands and is capable of transmitting light of any wavelength within the range 500 nm–12 μm. Owing to the above-specified layer-variation of composition with corresponding parabolic variation of refractive index, this light-conducting fiber has an extremely high transmitting capacity for infrared light. It may be used for the flexible transmission of a $CO_2$ laser beam, e.g., in the operating theater of a hospital, with the laser being situated more than 50 m away from the patient.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an optical fiber having infrared transmittancy, and a refractive index gradient, and which is prepared by chemical vapor deposition, the improvement wherein in the vitreous, light-conducting region of the fiber, the anions are predominantly S, Se, Te or combinations thereof, and the cations are Ge, Si, P, B, Sb, Ti or combinations thereof.

2. The improvement of claim 1 wherein the vitreous, light-conducting region includes additional anions selected from the group consisting of Cl, Br, I, F and combinations thereof.

3. The improvement of claim 2 wherein the additional anion is chloride.

4. The improved optical fiber of claim 1 wherein the vitreous, light-conducting region forms the central core of the fiber.

5. The improved optical fiber of claim 1 wherein the vitreous, light-conducting region forms an annular section surrounding the central core of the fiber.

6. A method of preparing an improved optical fiber of claim 1 having infrared transmittancy and a refractive index gradient, in which, in the vitreous light-conducting region of the fiber, the anions are predominantly S, Se or Te or combinations thereof, and the cations are Ge, Si, P, B, As, Sb, Ti or combinations thereof the method comprising propelling gaseous halides of the anions and cations into a decomposition region, decomposing the halides and coating the resultant anions and cations onto a glass substrate, wherein the propelling gas is an inert gas, a halogen or a mixture thereof.

7. The method of claim 6 wherein the anions are coated onto the internal surface of a glass tube, and which further comprises collapsing the tube into a preform rod and drawing the rod into a fiber.

8. The method of claim 6 wherein the anions and cations are coated onto the exterior surfaces of a glass rod, and which further comprises drawing the rod into a preform and then drawing the rod into a fiber.

9. The optical fiber prepared by the method of claim 6.

10. A method of transmitting infrared radiation which comprises conducting said radiation through the improved optical fiber of claim 1.

11. The optical fiber of claim 1 wherein the anions in the light-conducting region are 60–100% of anions of S, Se, Te or combinations thereof and 40–0% halides.

12. In an optical fiber having infrared transmittancy, and a refractive index gradient, and which is prepared by chemical vapor deposition, the improvement wherein the anions in the vitreous, light-conducting region of the fiber are predominantly S, Se, Te or combinations thereof and the cations in the vitreous, light-conducting region are Ge, Si, P, B, As, Sb, Ti or combinations thereof; and wherein the relative amounts of cations and anions are limited in accordance with the boundary conditions shown in FIGS. 3a–3i.

* * * * *